United States Patent [19]

Rudner et al.

[11] 4,275,169

[45] Jun. 23, 1981

[54] INTUMESCENT FLEXIBLE POLYURETHANE FOAM HAVING INCORPORATED INTO THE REACTION MIXTURE AN ALIPHATIC ALDEHYDE

[75] Inventors: Bernard Rudner, Ridgewood, N.J.; Herman Stone, Hazleton, Pa.

[73] Assignee: Tenneco Chemicals, Inc., Saddle Brook, N.J.

[21] Appl. No.: 76,876

[22] Filed: Sep. 19, 1979

[51] Int. Cl.$^3$ .............................................. C08G 18/14
[52] U.S. Cl. ..................................... 521/99; 521/106; 521/107; 521/132; 521/158
[58] Field of Search ................. 521/158, 99, 106, 107, 521/132

[56] References Cited

U.S. PATENT DOCUMENTS

| 2,912,435 | 11/1959 | Scholz | 260/248.5 |
| 3,080,256 | 3/1963 | Bundy | 260/29.2 UA |
| 3,179,626 | 4/1965 | Beitchman | 521/158 |
| 3,451,953 | 6/1969 | Sambeth et al. | 521/158 |
| 3,681,273 | 8/1972 | Kelly | 521/107 |
| 3,689,440 | 9/1972 | Glaesmann | 521/158 |
| 3,803,063 | 4/1974 | Krentz | 260/18 N |
| 3,808,159 | 4/1974 | Matalon | 521/158 |
| 4,139,501 | 2/1979 | Rudner et al. | 521/136 |
| 4,160,075 | 7/1979 | Golser | 521/158 |

*Primary Examiner*—Maurice J. Welsh
*Attorney, Agent, or Firm*—James P. Scullin

[57] ABSTRACT

Flexible polyurethane foam having reduced tendency to form burning embers and which produces a char when it is ignited and burned is provided by incorporating into the reaction mixture before foaming an aldehyde or an aldehyde generator.

In a preferred embodiment, flexible polyurethane foam of increased flame retardance is provided by also incorporating a flame retardant into the reaction mixture before foaming.

22 Claims, No Drawings

INTUMESCENT FLEXIBLE POLYURETHANE FOAM HAVING INCORPORATED INTO THE REACTION MIXTURE AN ALIPHATIC ALDEHYDE

BACKGROUND OF THE INVENTION

1. Field of the Invention

This invention relates to improvements in flexible, resilient, polyurethane foams, and in particular to improvements in the characteristics of such foams when subjected to fire. Flexible resilient polyurethane foams are made by the reaction of polyols and organic polyisocyanates in the presence of a blowing agent and one or more catalysts. The foams find a variety of uses, such as carpet underlay, textile innerlining, mattresses, pillows, furniture padding, cushions, automobile crash pads, and insulation. Unless formulated with special additives, polyurethane foams burn readily when ignited. It is known in the art to add various flame retardant chemicals to polyurethanes foam forming reaction mixtures, in particular to add halogenated esters of phosphorus. This has resulted in some improvement in the flammability properties, the extent of burning after ignition being reduced and the foams may even be made self-extinguishing to some degree; but while combustion does occur the foam melts and drips flaming embers which may ignite other flammable materials in the vicinity and thus cause the fire to spread. In order to overcome this problem, other additives have been added to polyurethane foam-forming reaction mixtures to render the finished foams intumescent, or to produce a char, once they have been ignited. Such foams are less prone to the development of flaming, dripping, embers during combustion, and may produce a char which acts as a thermal insulation and thus aids in preventing the spread of a fire.

2. Description of the Prior Art

In U.S. Pat. No. 3,681,273 the use of a mixture of a nitrogen and phosphorus containing compound such as monoammonium phosphate, melamine phosphate, or urea phosphate, and an N-alkylol substituted polyalkylene polyamine as an additive to conventional flexible polyurethane foam reaction mixtures is disclosed. The resultant foams are flame-retardant, intumescent, and non-burning.

U.S. Pat. No. 3,803,063 discloses a flexible polyurethane foam reaction mixture containing an additive comprising a nitrogen and phosphorus containing compound such as monoammonium phosphate or an ammonium phosphate and a polycondensate of polymerized unsaturated fatty acids with aliphatic amines.

In U.S. Pat. No. 4,139,501, Rudner, Noone and Pauly disclose flexible polyurethane foams having reduced tendency to form burning embers when ignited and burned, produced by incorporating into the foam-forming reaction mixture a melamine derivative wherein one or more hydrogen atoms have been replaced by hydroxymethyl and/or lower alkoxymethyl groups. Alternatively, a halogenated phosphorus ester can also be included in the reaction mixture.

SUMMARY OF THE INVENTION

This invention provides flexible, resilient, polyurethane foam with intumescent properties and reduced tendency to form burning, dripping, embers during combustion. These foams are substantially equal in properties to those provided by the disclosure of U.S. Pat. No. 4,139,501, but are obtained at lower cost. This improvement is provided by adding to a conventional polyurethane foam-forming reaction mixture at least one aldehyde or aldehyde generator, such as formaldehyde, paraformaldehyde, glyoxal or hexamethylenetetramine. The aldehyde or aldehyde generators are generally less costly per unit weight and generally effective in lesser amounts as compared with the melamine derivatives used in the method of U.S. Pat. No. 4,139,501. Preferably, the foam-forming reaction mixture also contains a flame-retardant such as a phosphate ester, a halogenated phosphate ester, or a halogenated hydrocarbon.

The novel products of this invention, rather than being stiff and rigid, retain substantially the flexibility, resilience, cell structure, permeability, and hand of conventional flexible polyurethane foams which do not contain the aldehydes or aldehyde generators employed in the present process. As a consequence, the foams of this invention can be used in most or all of the applications where conventional flexible foams have heretofore been used. These novel foams can, if desired, be peeled, split, or sliced into sheets of any desired thickness using techniques well-known in the art, and the flexible sheets also can be rolled up for convenient storage and transportation. Like conventional flexible polyurethane foams, the products of the present process can be laminated to textiles or plastic substrates by conventional methods, such as flamelamination or by means of adhesives.

Although the foams of this invention have the appearance and flexibility of conventional foams, once they are ignited they form a char and have a greatly reduced tendency to form burning embers. As is well known, one of the disadvantages of conventional polyurethane foams and other synthetic polymers is the fact that when they are ignited they tend to melt and form burning embers which can drip and cause the spread of flames to other nearby materials. Even when such materials contain halogenated phosphorus esters as flame-retardants they can still produce smoldering, dripping embers which can ignite nearby materials which are not flame-retardant. These disadvantages are substantially overcome by the products of the process of the present invention.

DETAILED DESCRIPTION OF THE INVENTION

The objective of this invention is accomplished by incorporating into an otherwise conventional polyurethane foam-forming reaction mixture at least one low-molecular weight aliphatic aldehyde or aldehyde generator. The preferred low-molecular aliphatic aldehydes are those that contain from 1 to 4 carbon atoms, such as formaldehyde, acetaldehyde, propionaldehyde, butyraldehyde, glyoxal, acrolein, and the like. Formaldehyde is particularly preferred. The aldehyde generators that are useful in the practice of this invention are compounds that are capable, under the conditions which prevail when polyurethane foams are ignited, of releasing low molecular weight aliphatic aldehydes or of producing a char. Such aldehyde generators include paraformaldehyde, metaldehyde, acetals and semi-acetals of low molecular weight aliphatic aldehydes, hexamethylenetetramine (also known as methenamine or urotropine), and the like. As an aldehyde generator we prefer to use paraformaldehyde or hexamethylenetetramine, and particularly prefer the latter.

Although we prefer to use a single aldehyde or a single aldehyde generator, a mixture of two or more aldehydes or a mixture of one or more aldehydes and one or more aldehyde generators can be used if desired, without departing from the scope of this invention.

Formaldehyde can be conveniently added as a concentrated aqueous solution such as, by way of example, a 37% solution stabilized with 12% methanol. Paraformaldehyde has an advantage in that it is substantially free from water, and thus allows greater freedom in formulating the reaction mixture since the water contained in an aqueous formaldehyde solution will function as a blowing agent. The preferred aldehyde generator in carrying out this invention is hexamethylenetetramine, which can be added either as a concentrated aqueous solution or as a dry powder. It is particularly preferred to add it as a dry powder, and for this purpose the most preferred form is a dry powder which has been made free-flowing by the addition of a minor amount of benzoic acid, methylbenzoic acid, or chlorobenzoic acid as an anti-agglomerant, as taught by U.S. Pat. No. 2,912,435 for example. An alternative method for adding hexamethylenetetramine, with or without an anti-agglomerant, is to first form a pre-blend with clay and then add the pre-blend to the mixture to be foamed. Coated clays are preferred. One example of a suitable clay for this purpose is KAOGAN 7, a product of Georgia Kaolin Co. and being treated kaolinite prepared as described in U.S. Pat. No. 3,080,256. Other useful clays are described in U.S. Pat. No. 3,151,993.

The amount of the aldehyde or aldehyde generator to be added is not critical and can be varied over a range of from about 0.8 to about 20 parts by weight per 100 parts by weight of polyol in the reaction mixture. A preferred range is from about 1 to about 10 parts by weight, and the most preferred range is from about 2 to about 6 parts by weight. When clay is used in admixture with hexamethylenetetramine, it is preferred to use an amount approximately equal in weight to the weight of hexamethylenetetramine, although lesser or greater amounts can be used if desired. For example, the weight of clay can range from about half to about twice the weight of hexamethylenetetramine.

Although an aldehyde or aldehyde generator, or mixtures thereof, can be used alone in order to impart intumescence and to reduce the tendency to form flaming, dripping embers we prefer to also include a flame retardant in the foam-forming reaction mixture. Suitable flame retardants are those conventionally used in the art of making flexible polyurethane foams, and include tri-esters of phosphoric acid, halogenated tri-esters of phosphoric acid, halogenated hydrocarbons, and the like.

Examples of suitable flame retardants are: tris (1,3-dichloropropyl) phosphate, tris (2,3-dibromopropyl) phosphate, 2,2-bis(chloromethyl)-1,3-propylene bis [di (2-chloroethyl) phosphate], tris (2-chloroethyl) phosphate, tris (2-chloropropyl) phosphate, bis (dichloropropyl) tribromoneopentyl phosphate, tricresyl phosphate, cresyl diphenyl phosphate, chlorinated paraffin, and brominated paraffin. We prefer to use halogenated phosphates, and particularly prefer tris (1,3-dichloropropyl) phosphate. Although a single flame retardant is preferred from the stand point of simplicity of formulation, mixtures of two or more of the same type or of different types may be found to give improved performance in some cases and such mixtures are included in the scope of this invention. The amount of flame retardant is not critical and can be varied over a wide range, such as from about 2 to about 30 parts by weight per 100 parts by weight of polyol in the reaction mixture. It is preferred to use from about 5 to about 20 parts by weight, and particularly preferred to use from about 7 to about 20 parts by weight.

It will be understood by those skilled in the art that the amount of aldehyde or aldehyde generator, and of flame retardant, to be used will depend on the degree of intumescence and flame retardance desired for a given application. A suitable amount can be readily determined with only a minimum of experimentation.

The mixture to be foamed will include at least one polyol, at least one organic polyisocyanate, at least one blowing agent, and at least one catalyst. Alternatively, the mixture to be foamed can also comprise other known additives and compounding ingredients for the preparation of polyurethane foams. Such additives and ingredients include, by way of example, fillers, pigments or other colorants, surfactants, foam stabilizers, cell openers, lubricants, microbicides, and so forth.

The polyol can be one or more polyether polyols, one or more polyester polyols, or a mixture of one or more polyether polyols and polyester polyols.

The polyols suitable for use in the present invention can be polyether polyols, such as those made by the addition of an excess of propylene-1,2-oxide to hexane triol, trimethylolpropane, glycerol, triethanolamine or a polyethylene glycol. Also, the polyols suitable for use in this invention can be polyester polyols or a mixture of polyester polyols and polyether polyols. The polyester polyol can be prepared, for example, by reacting a dicarboxylic acid, such as adipic acid, with a mixture of a diol, such as diethylene glycol, and a triol, such as glycerol.

The polyether polyol can also be selected from any of the wide variety of polyhydric polyether compounds available and conventionally used by the art for the preparation of flexible polyether-type polyurethanes. The most common polyether polyol compounds, the polyoxyalkylene polyether polyols, are generally prepared by the reaction of an alkylene oxide, such as propylene-1,2-oxide, with a polyhydric initiator or starter. The polyhydric initiator or starter can be, for example, glycerol, trimethylolethane, trimethylolpropane, triethanolamine or a polyethylene glycol.

The alkylene oxides used in preparing the polyethers preferably are those which contain from two to four carbon atoms, for example, ethylene oxide, 1,2-propylene oxide, 1,2-butylene oxide, trimethylene oxide and tetramethylene oxide. Also useful are the poly(aralkylene ether) polyols which are derived from the corresponding aralkylene oxides such as, for example, styrene oxide, alone or mixed with an alkylene oxide. Generally, propylene oxide, i.e., the 1,2-propylene oxide, and mixtures of 1,2-propylene oxide with ethylene oxide, are preferred for the preparing of the polyether polyol reactant. The polyether polyols can also be grafted, as for example with acrylonitrile/styrene.

The polyethers for use in the present invention preferably have a molecular weight of from about 500 to about 6500 and optimally of from about 2800 to about 4600 and an average hydroxy functionality of at least 2.5 to about 3.1.

The polyester polyol reactants useful in the present invention include any conventionally used in the preparation of flexible and semi-flexible urethane polymer foams. The polyhydric polyester reactant usually has a molecular weight of at least about 400 and optimally between about 500 and about 5000. The hydroxyl number of the compound is correspondingly in the range of from about 15 to about 300. The preferred average hydroxyl functionality for the polyester resins is from about 2.2 to 2.8.

The range of polyester polyol compounds useful for preparing the flexible polyurethane foams in the present inventions is well known to the art, and the polyester polyol compounds can be prepared by, for example, the reaction of a polyhydric alcohol with a polycarboxylic acid compound, each containing from two to about 36 or more carbon atoms in the molecule. The polycarboxylic acid includes such acid precursors as the corresponding acid anhydrides or acid halides or even, for example, alkyl esters. The preferred acids are the dicarboxylic acids containing from 4 to 36 carbon atoms in the molecule. Examples of such preferred carboxylic acid compounds which can be used include, for example, aromatic acids, such as phthalic acid, terephthalic acid, isophthalic acid, tetrachlorophthalic acid, cycloaliphatic acids such as dimerized linoleic acid, maleated and fumarated resin acids, and cyclohexane-1,4-diacetic acid, but especially the aliphatic acids such as itaconic, oxydipropionic, succinic, glutaric, adipic, azelaic, suberic and sebacic acids, or combinations of such acids. The polyester polyols can also be prepared from the corresponding lactones, such as gamma-butyrolactone or epsiloncaprolactone, for example, by self-condensation on a diol-triol initiator.

The polyhydric alcohol used in the preparation of the polyester polyol is generally a mixture of a dihydric and a trihydric alcohol. Preferably, a mixture of polyols, the major portion having a functionality of two and the minor a functionality of three, is used. This mixture of di- and tri-functional polyols is utilized to give an average functionality of between two and three. A functionality of greater than two is desirable to provide crosslinking in the reaction between the polyester polyol and the polyisocyanate to form a flexible, but strong foam. It has been found to be preferable to obtain this additional functionality by using trihydric or higher polyols in a minor amount when forming the polyester polyol.

It is recognized that certain compounds which are considered by those skilled in the art as polyester resins also contain either linkages, e.g., esters prepared from dipropylene glycol. However, the primary character of such resins is considered to be that of an ester.

The organic polyisocyanates useful in the present invention are also conventional. They contain at least two isocyanate groups per molecule. preferably, the isocyanate mixture selected has an isocyanate functionality of from 2.0 to 3.0. The useful isocyanates are the aromatic polyisocyanates alone or admixed with aliphatic, cycloaliphatic or heterocyclic polyisocyanates.

The aromatic diisocyanates are generally the least expensive and most suitable polyisocyanates available. The aromatic diisocyanates, especially the toluene diisocyanate isomers, are used commercially in the preparation of foam by the one-shot, continuous slab-stock process. However, for certain purposes, other polyisocyanates, especially the aliphatic, aralkyl and cycloalkyl polyisocyanates, have valuable properties and can be used, if desired, in admixture with, e.g. toluene diisocyanates. The aralkyl, aliphatic and cycloaliphatic polyisocyanates are especially useful when resistance against degradation and discoloration due to oxidation or light is needed. The non-aryl polyisocyanates are generally not useful alone, but can be used in combination with the other types for special purposes.

Suitable organic polyisocyanates include, for example, n-butylene diisocyanate, methylene diisocyanate, m-xylyl diisocyanate, p-xylyl diisocyanate, cyclohexyl-1, 4-diisocyanate, dicyclohexylmethane-4, 4'-diisocyanate, m-phenylene diisocyanate, p-phenylene diisocyanate, 3-(alphaisocyanatoethyl)-phenyl isocyanate, 2,6-diethylbenzene-1, 4-diisocyanate, diphenyldimethylmethane-4, 4'-diisocyanate, ethylidene diisocyanate, propylene-1,2-diisocyanate, cyclohexylene-1, 2-diisocyanate, 2,4-toluene diisocyanate, 2,6-toluene diisocyanate, 3,3'-dimethyl-4'-biphenylene diisocyanate, 3,3'-dimethoxyl-4,4'-biphenylene diisocyanate, 3,3-diphenyl-4,4'-biphenylene diisocyanate, 4,4-biphenylene diisocyanate, 3,3'-dichloro-4,4'-biphenylene diisocyanate, 1,5-naphthalene diisocyanate, isophorone diisocyanate, m-xylylene diisocyanate, triazine triisocyanate, triketotrihydrotris(isocyanatophenyl) triazine and tris-(isocyanatephenyl) methane.

Generally, in carrying out the urethane polymerization reactions, the only significant groups in the reactant compounds are the isocyanate groups and active hydrogen groups which are reactive therewith. Acyclic, alicyclic, aromatic and heterocyclic radicals are all possible substituents on the active hydrogen and polyisocyanate reactants.

The preferred blowing agent for general use in the production of the flexible polyurethane foam is water. The advantages of using water are low cost and the stability which the use of water adds to the foam-making. The water-isocyanate reaction gives not only gas for blowing, but also produces urea-containing polymer very quickly, contributing materially to early polymer strength needed to hold the gas inside, to form foam. Generally, when water is used, it is present in proportions of from about 0.5 to about 6 weight percent of water based on the total weight of the reacting polyols. Blowing agents which do not react with the isocyanate can be used as an adjunct with water or as a total replacement of water. These include compounds which are vaporized at the temperatures produced by the exotherm of the isocyanate-reactive hydrogen reaction. The various blowing agents are well known in the art and constitute no part of the present invention. Other blowing agents that are preferably used by the art include certain halogen-substituted aliphatic or cyclo-aliphatic hydrocarbons having boiling points between about $-40°$ C. and $+100°$ C., including methylene chloride; the volatile fluorocarbons, such as trichloromonofluoromethane, dichlorodifluoromethane, and 1-chloro-2-fluoroethane; low boiling hydrocarbons such as n-propane, cyclopropane, butane, isobutane, pentane, hexane, cyclohexane and their mixtures, and the like.

As is conventional in the art pertaining to the manufacture of polyurethane foam, the reaction mixture will also contain a catalyst. Catalysts suitable for use in this invention are conventional ones in the polyurethane foam art, and include tertiary amines and metallic compounds. Useful tertiary amines include: N-alkylmorpholines such as N-ethylmorpholine; N,N-dialkylcyclohexylamines where the alkyl groups are methyl, ethyl, propyl, butyl, etc.; trialkylamines such as triethylamine, tripropylamine, tributyamine, triamylamine, etc.; triethylenediamine, bis (2-dimethylaminoethyl) ether; N,N-dimethylaminoethyl-N',N'-dimethylaminopropyl ether; the tertiary amine sold by Jefferson Chemical Co., under the name THANCAT DD: and other tertiary amines well known in the art. Useful metal compounds include those of bismuth, lead, titanium, iron, antimony, uranium, cadmium, cobalt, aluminum, mercury, zinc, nickel, cerium, vanadium, copper, manganese, zirconium, tin, and others. Tin compounds are particularly useful, some examples being stannous octoate, stannous 2-ethylhexoate, stannous oleate, dibutyltin bis (2-ethylhexoate), and dibutyltin dilaurate. The levels of catalyst used are conventional.

As is also conventional in the art pertaining to the manufacture of polyurethane foam, the reaction mixture can also contain a surfactant if desired, preferably an organosilicon surfactant, also commonly termed silicone surfactant. As is well known in the art, silicone surfactants perform several functions in the formation of polyurethane foams, including the prevention of collapse during foam rise and the control of cell size. The organosilicon surfactants contain one or more hydrophobic groups and one or more hydrophilic groups. The hydrophobic groups comprise a plurality of silicon atoms, generally in the form of repeating siloxane groups. The hydrophilic groups generally consist of a plurality of oxalkylene radicals in the form of a chain of repeating units. In one type of silicone surfactant, the backbone of the molecule comprises a chain of siloxane groups to which are attached pendant polyoxyalkylene hydrophilic groups. In another type, a chain of alternating polysiloxane and polyoxyalkylene segments form the backbone of the molecule. In a third, less common type, the polymer backbone is formed by a carbon-to-carbon chain to which are attached silicon atoms and long chain hydrophilic groups. The various types of organosilicon surfactants for use in the manufacture of polyurethane foam are well known in the art, described extensively in the literature, and sold commercially. Some representative organosilicon surfactants which are suitable for use in the present invention are: L-520, L-540, and L-5720 manufactured by Union Carbide Corp.; and DC-191, DC-196 and DC-198 manufactured by Dow Corning. The amount of organosilicon surfactant used in this invention will generally be in the range of from about 0.01 to about one part by weight per 100 parts by weight of polyol, although lesser or greater amounts can be used, if desired.

The polyurethane foams according to this invention can be prepared by any of the methods known in the art, including prepolymer, quasi-prepolymer, and one-shot, batchwise or continuous. It is preferred to prepare them continuously by the one-shot method in the form of large buns having a rectangular or circular cross-section which can then be split or peeled into sheets of suitable thickness. For example, buns having a circular cross-section and suitable for peeling are disclosed in U.S. Pat. No. 3,874,988, to Buff et al. The polyurethane foams can be essentially completely open-celled, such as those disclosed in U.S. Pat. No. 3,748,288 to Winkler et al or U.S. Pat. No. 3,884,848 to Ricciardi et al, or reticulated foams made by any of the reticulation methods known in the art. The foams can also be partly open-celled, or predominently closed-celled.

Of the following examples, some of which are comparative examples according to the prior art and others of which are according to the present invention, those made according to the present invention are illustrative thereof but not limitative thereof. In these examples, all amounts shown are parts by weight.

The foams were evaluated by a modification of the procedure of UL 94, Standard for Tests for Flammability of Plastic Materials for Parts in Devices and Appliances, published by Underwriters Laboratories Inc. The modification of UL 94 was in the measurement of flame time. The standard test calls for starting to count flame time 60 seconds after ignition, whereas in the procedure used herein flame time was counted from the start of ignition.

The following are the identities of the various ingredients used in the examples. CP-3140 is a polyether polyol, propoxylated glycerol, having a hydroxyl number of 44, sold by Dow Chemical. Pluracol 637 (PS 637) is a propoxylated glycerol/acrylonitrile/stryene copolymer having a hydroxyl number of 40, sold by BASF Wyandotte, F-76 is FOMREZ 76, a polyester prepared from diethylene glycol, adipic acid, ethylene glycol, and glycerin, sold by Witco. 9148 is a dispersion of polyhydroazodicarbonamide in a polyether polyol, as disclosed in U.S. Pat. No. 4,042,537, sold by Mobay. TDI stands for tolylene diisocyanate (also called toluene diisocyanate). The numbers which follow "TDI" indicate the ratio of the 2,4 and 2,6 isomers (e.g., TDI 65/35 is a 65/35 mixture of tolylene 2,4-diisocyanate and tolylene 2,6-diisocyanate). M66-82 is a surfactant comprised of a mixture of modified fatty acid esters, and A 390 is a surfactant comprised of a mixture of modified fatty acid esters plus a silicone, both sold by Witco. L-550 and L-5720 are siloxane/oxyalkylene copolymer surfactants, sold by Union Carbide. DC-200 (50 cs) is a polydimethylsiloxane having a viscosity of 50 centistokes, sold by Dow Corning. NEM is N-ethylmorpholine, sold by Jefferson Chemical as THANCAT NEM. DM-16D, 16-D, and B-16 stand for n-hexadecyldimethylamine, sold by Lonza as BAIRCAT B-16. NCM is N-cocomorpholine, sold by Lonza as BAIRCAT NCM. ESN is a mixture of 95% dimethylaminopropionitrile and 5% A-1, sold by Union Carbide as NIAX ESN. A-1 is a mixture of 70% bis (dimethylaminoethyl) ether and 30% dipropylene glycol, sold by Union Carbide as NIAX A-1. 33 LV is a mixture of 33% triethylene diamine and 67% dipropylene glycol, sold by Air Products as DABCO 33LV. C-2 is stannous octoate, and C-4 is a 1/1 mixture of stannous octoate and di(2-ethylhexyl) phthalate, sold by Witco as FOMREZ C-2 and FOMREZ C-4, respectively. CNF-664 is a ⅓ mixture of stannous phenoxide and cresyl diphenyl phosphate, sold by M & T Chemicals. CDP is cresyl diphenyl phosphate. KAYDOL is a white mineral oil, sold by Witco. 73D, 73K, 3817 and 58D are dispersions of black pigments in organic vehicles (black pastes). KAOGAN 7 is a surface-treated aluminum silicate clay, sold by Toebe Chemical. FR-2 is tris (1,3-dichloropropyl) phosphate sold by Stauffer Chemical as FYROL FR-2. CYMEL 481 is a 70% solution of tris (methoxymethyl) tris (hydroxymethyl) melamine, sold by American Cyanamid. R-525 is bis (dichloropropyl) tribromoneopentyl phosphate. KLORO 4515 is a brominated paraffin 815.2% Br) sold by Keil. 2XC-20 is a chlorinated phosphate sold by Monsanto.

TABLE I

| Hand Batch Formulations & Flammability Results | | | | |
|---|---|---|---|---|
| Example | 1 | 2 | 3 | 4 |
| Polyester prepared from diethylene glycol, adipic acid, and trimethylolethane; OH no. 56 | 100.0 | 100.0 | 100.0 | 100.0 |
| M66-82 | 1.50 | 1.50 | 1.50 | 1.50 |

TABLE I-continued

Hand Batch Formulations & Flammability Results

| Example | 1 | 2 | 3 | 4 |
|---|---|---|---|---|
| NEM | 0.5 | 0.5 | 0.5 | 0.5 |
| DM-16D | 0.5 | 0.5 | 0.5 | 0.5 |
| C-2/CDP | 1.2 | 1.2 | 1.2 | 1.2 |
| Water | 3.70 | 3.15 | 3.70 | 3.70 |
| TDI 65/35 | 50.1 | 50.1 | 50.1 | 50.1 |
| Black Paste | 7.5 | 7.5 | 7.5 | 7.5 |
| NCM | 0.8 | 0.8 | 0.8 | 0.8 |
| KAYDOL | 0.2 | 0.2 | 0.2 | 0.2 |
| FR-2 | 20.0 | 20.0 | 20.0 | 20.0 |
| 37% Formaldehyde | — | 1.0 | — | — |
| Paraformaldehyde | — | — | 1.0 | — |
| Methenamine | — | — | — | 1.0 |
| Flammability | | | | |
| UL - Subject 94: | | | | |
| ATB, sec. | 39.0 | 40.0 | 53.0 | 48.0 |
| AEB, inches | 1.43 | 1.63 | 1.48 | 1.47 |
| Char Formation | no | yes | yes | yes |
| Ignited Cotton | no | no | no | no |
| Drip Rating | low | none | none | none |

ATB = average time of burn, sec.
AEB = average extent of burn, in.

The index for Examples 1–4 was 111. Example 1 is a comparator made according to the prior art, with a flame retardant (FR-2) but without an aldehyde or aldehyde generator.

TABLE II

Hand Batch Formulations & Flammability Results

| Example | 5 | 6 | 7 | 8 | 9 | 10 | 11 | 12 | 13 |
|---|---|---|---|---|---|---|---|---|---|
| Polyester prepared from diethylene glycol, adipic acid, and trimethylolethane; OH no. 56 | 100 | 100 | 100 | 100 | 100 | 100 | 100 | 100 | 100 |
| KAYDOL | 0.2 | 0.2 | 0.2 | 0.2 | 0.2 | 0.2 | 0.2 | 0.2 | 0.2 |
| NCM | 0.8 | 0.8 | 0.8 | 0.8 | 0.8 | 0.8 | 0.8 | 0.8 | 0.8 |
| M6682/water 3.0/2.4 | 2.7 | 2.7 | — | — | — | — | — | — | — |
| M6682/water 3.0/7.4 | — | — | 5.2 | 5.2 | 5.2 | 5.2 | 5.2 | 5.2 | 5.2 |
| Black 73D | 7.5 | 7.5 | 7.5 | 7.5 | 7.5 | 7.5 | 7.5 | 7.5 | 7.5 |
| NEM | 0.5 | 0.5 | 0.5 | 0.5 | 0.5 | 0.5 | 0.5 | 0.5 | 0.5 |
| 16-D | 0.5 | 0.5 | 0.5 | 0.5 | 0.5 | 0.5 | 0.5 | 0.5 | 0.5 |
| C-2 | 1.5 | 1.5 | 1.5 | 1.5 | 1.5 | 1.5 | 1.5 | 1.0 | 1.0 |
| TDI 65/35 | 50.1 | 50.1 | 50.0 | 50.1 | 50.0 | 50.1 | 50.1 | 50.1 | 50.1 |
| FR-2 | 20.0 | — | 20.0 | 20.0 | 20.0 | 20.0 | 20.0 | 20.0 | 20.0 |
| R-525 | — | 20.0 | — | — | — | — | — | — | — |
| CYMEL 481 | 12.5 | 12.5 | — | — | — | — | — | — | — |
| Paraformaldehyde | — | — | 1.0 | 3.0 | 5.0 | 10.0 | — | — | — |
| Methenamine | — | — | — | — | — | — | 1.0 | 3.0 | 5.0 |
| Density, pcf | 2.17 | 2.24 | 2.35 | 2.41 | 2.51 | 2.54 | 2.42 | 2.48 | 2.30 |
| Air Permeability | 0.08 | 0.06 | 0.20 | 0.05 | 0.03 | 0.12 | 0.05 | 0 | 0 |
| UL-Subject 94: | | | | | | | | | |
| Burn Time, sec. | 36.3 | 35.3 | 41.6 | 35.7 | 35.7 | 29.7 | 46.6 | 41.2 | 35.8 |
| Burn Extent, inches | 1.03 | 0.89 | 1.20 | 1.00 | 0.91 | 0.98 | 1.35 | 1.01 | 1.04 |
| Ignited Cotton | no | no | no | no | no | no | no | no | no |
| Number of drops | 0 | 0 | 0 | 0 | 0 | 0 | 0 | 0 | 0 |
| Char formation | yes | yes | yes | yes | yes | yes | yes | yes | yes |

The index for Examples 5–13 was 111. Examples 5 and 6 are comparators made according to the teachings of U.S. Pat. No. 4,139,501.

TABLE III

Hand Batch Formulations

| Example | 14 | 15 | 16 | 17 | 18 |
|---|---|---|---|---|---|
| Polyester prepared from diethylene glycol, adipic acid, and trimethylolethane; OH no. 56 | 100.0 | 100.0 | 100.0 | 100.0 | 100.0 |
| Black 73D | 7.45 | 7.45 | 7.45 | 7.45 | 7.45 |
| Water | 1.29 | 3.92 | 3.92 | 3.92 | 3.92 |
| ESN | 0.5 | 0.5 | 0.5 | 0.5 | 0.5 |
| B-16 | 0.2 | 0.2 | 0.2 | 0.2 | 0.2 |
| A-390 | 1.5 | 1.5 | 1.5 | 1.5 | 1.5 |
| NCM/KAYDOL ¼ | 1.0 | 1.0 | 1.0 | 1.0 | 1.0 |
| CNF-664 | 1.2 | 0.6 | 0.3 | 0.3 | 0.3 |

TABLE III-continued

Hand Batch Formulations

| Example | 14 | 15 | 16 | 17 | 18 |
|---|---|---|---|---|---|
| TDI 65/35 | 54.1 | 54.1 | 54.1 | 54.1 | 54.1 |
| FR-2 | 20.0 | 20.0 | 20.0 | 20.0 | — |
| CYMEL 481 | 10.1 | — | — | — | — |
| Hexamethylenetetramine* | — | 2.5 | 5.0 | 5.0 | 5.0 |
| KAOGAN 7 | — | — | 5.0 | 5.0 | 5.0 |

*treated with benzoic acid

The index for Examples 14–18 was 115. In Example 17, the hexamethylenetetramine and FR-2 were blended together with KAOGAN 7 before addition to the other ingredients. In Example 18, the hexamethylenetetramine and KAOGAN 7 were blended together before addition. Example 14 is a comparator made according to the teachings of U.S. Pat. No. 4,139,501. The results obtained with these examples are summarized in Table IV.

TABLE IV

Flammability Results

| Example | 14 | 15 | 16 | 17 | 18 |
|---|---|---|---|---|---|
| Density, lb./cu.ft. | 2.36 | 2.27 | 2.22 | 1.86 | — |
| Air Permeability | 0.3 | 0.6 | 0.6 | 0.4 | — |
| Tensile Strength, psi | 18.6 | 18.8 | 17.1 | 12.7 | — |
| Elongation, % | 124 | 128 | 122 | 111 | — |
| Tear Strength, lb./in. | 2.5 | 3.2 | 2.6 | 2.8 | — |
| UL 94-Unaged | | | | | |
| Burn time, sec. | 48.8 | 58.4 | 50.1 | 42.7 | 100.3 |
| Burn Extent, in. | 0.78 | 1.00 | 1.03 | 0.90 | 3.88 |
| Ignited Cotton | no | no | no | no | no |
| Number of Drops | 0 | 0 | 0 | 0 | 0 |
| Char formation | yes | yes | yes | yes | yes |
| UL 94-Aged | | | | | |
| Burn Time, sec. | 47.7 | 53.3 | 58.2 | 46.8 | 109.5 |
| Burn Extent, in. | 1.20 | 1.10 | 1.36 | 1.00 | 4.33 |
| Ignited Cotton | no | no | no | no | no |
| Number of Drops | 0 | 0 | 0 | 0 | 0 |
| Char Formation | yes | yes | yes | yes | yes |

TABLE V

| Example | \multicolumn{6}{c}{Hand Batch Formulations} | | | | | |
|---|---|---|---|---|---|---|
| | 19 | 20 | 21 | 22 | 23 | 24 |
| Polyester prepared from diethylene glycol, adipic acid, and trimethylolethane; OH no. 56 | 100.0 | 100.0 | 100.0 | 100.0 | 100.0 | 100.0 |
| Black 73D | 7.45 | 7.45 | 7.45 | 7.45 | 7.45 | 7.45 |
| Water | 1.29 | 1.29 | 1.29 | 1.29 | 1.29 | 1.29 |
| ESN | 0.5 | 0.5 | 0.5 | 0.5 | 0.5 | 0.5 |
| B-16 | 0.2 | 0.2 | 0.2 | 0.2 | 0.2 | 0.2 |
| A-390 | 1.5 | 1.5 | 1.5 | 1.5 | 1.5 | 1.5 |
| NCM/KAYDOL 4/1 | 1.0 | 1.0 | 1.0 | 1.0 | 1.0 | 1.0 |
| CNF-664 | 1.2 | 0.6 | 1.2 | 1.2 | 1.2 | 0.15 |
| TDI 65/35 | 54.1 | 54.1 | 54.1 | 54.1 | 54.1 | 54.1 |
| FR-2 | 20.0 | 10.0 | 20.0 | 10.0 | 20.0 | 20.0 |
| CYMEL 481 | 10.1 | — | — | — | — | — |
| Hexamethylenetetramine* | — | 2.5 | 2.5 | 2.5 | 2.5 | — |
| Hexamethylenetetramine | — | — | — | — | — | 2.5 |
| KAOGAN 7 | — | — | — | 5.0 | 5.0 | 5.0 |

*treated with benzoic acid

The index for Examples 19–24 was 115. Example 19 is a comparator made according to the teachings of U.S. Pat. No. 4,139,501. The results obtained with these examples are summarized in Table VI.

TABLE VI

| Example | \multicolumn{6}{c}{Flammability Results} | | | | | |
|---|---|---|---|---|---|---|
| | 19 | 20 | 21 | 22 | 23 | 24 |
| Density, lb./cu.ft. | 2.35 | 2.16 | 2.22 | 1.93 | 2.28 | 2.53 |
| Air Permeability | 0.10 | 0.10 | 0.16 | 0.0 | 0.10 | 0.62 |
| Tensile Strength, psi | 23.5 | 21.6 | 19.2 | 19.0 | 21.5 | 21.4 |
| Elongation, % | 172 | 153 | 155 | 153 | 162 | 166 |
| Tear Strength, lb.in. | 3.6 | 3.3 | 3.4 | 3.0 | 3.6 | 4.2 |
| UL 94-Unaged | | | | | | |
| Burn Time, sec. | 44.9 | 44.6 | 48.5 | 42.3 | 46.4 | 50.5 |
| Burn Extent, in. | 0.98 | 1.28 | 1.18 | 1.33 | 1.36 | 1.50 |
| Ignited Cotton | no | no | no | no | no | no |
| Number of drops | 0 | 0 | 0 | 0 | 0 | 0 |
| Char Formation | yes | yes | yes | yes | yes | yes |
| UL 94-Aged | | | | | | |
| Burn Time, sec. | 46.3 | 43.6 | 39.9 | 45.5 | 44.7 | 59.1 |
| Burn Extent, in. | 0.93 | 1.45 | 1.08 | 1.25 | 1.20 | 1.70 |
| Ignited Cotton | no | no | no | no | no | no |
| Number of Drops | 0 | 0 | 0 | 0 | 0 | 0 |
| Char Formation | yes | yes | yes | yes | yes | yes |

TABLE VII

| Example | \multicolumn{2}{c}{Hand Batch Formulations} | |
|---|---|---|
| | 25 | 26 |
| CP-3140 | 100.0 | 100.0 |
| L-5720 | 0.7 | 0.7 |
| Water | 3.4 | 3.4 |
| 33 LV | 0.03 | 0.03 |
| A-1 | 0.09 | 0.3 |
| C-4 | 0.75 | 0.3 |
| TDI 80/20 | 41.2 | 41.2 |
| FR-2 | 27.0 | 20.0 |
| Hexamethylenetetramine* | — | 5.0 |

*treated with benzoic acid

The index for Examples 25–26 was 104. Example 25 is a comparator made according to the prior art, with a flame retardant but without an aldehyde or aldehyde generator. The results obtained on these examples are summarized in Table VIII.

TABLE VIII

| Example | \multicolumn{2}{c}{Flammability Results} | |
|---|---|---|
| | 25 | 26 |
| Density, lb./cu.ft. | 2.55 | 2.75 |
| Air Permeability | 1.3 | 0.50 |
| Tensile Strength, psi | 15.5 | 9.2 |

TABLE VIII-continued

| Example | \multicolumn{2}{c}{Flammability Results} | |
|---|---|---|
| | 25 | 26 |
| Elongation, % | 271 | 126 |
| Tear Strength, lb./in. | 3.7 | 2.0 |
| UL 94-Unaged | | |
| Burn Time, sec. | 36.2 | 63.8 |
| Burn Extent, in. | 1.33 | 1.93 |
| Ignited Cotton | no | no |
| Number of Drops | 3 | 3 |
| Char Formation | no | yes |
| UL 94-Aged | | |
| Burn Time, sec. | 28.8 | 54.8 |
| Burn Extent, in. | 1.13 | 1.68 |
| Ignited Cotton | no | no |
| Number of Drops | 4 | 5 |
| Char Formation | no | yes |

Examples 25 and 26 are polyether polyurethane foams, which are more difficult to render flame retardant. Example 26 shows that a combination of hexamethylenetatramine and a reduced amount of the more costly chlorinated phosphate flame retardant was essentially equal in effectiveness to a greater amount of the chlorinated phosphate.

TABLE IX

| Example | 27 | 28 | 29 |
|---|---|---|---|
| Polyester prepared from diethylene glycol, adipic acid, and glycerol; OH no. 52 | 85.0 | 85.0 | 85.0 |
| PLURACOL 637 | 15.0 | 15.0 | 15.0 |
| L-550 | 2.2 | 2.2 | 2.2 |
| Water | 3.5 | 3.5 | 3.5 |
| A-1 | 0.2 | 0.2 | 0.2 |
| ESN | 0.1 | 0.1 | 0.1 |
| L-550 | 1.0 | 1.0 | 1.0 |
| DC-200 (50 cs) | 0.6 | 0.6 | 0.6 |
| C-4 | 0.65 | 0.65 | 0.65 |
| TDI 75/25 | 46.7 | 46.7 | 46.7 |
| FR-2 | 20.0 | 20.0 | 20.0 |
| Hexamethylenetetramine* | — | 1.0 | 2.0 |

*containing benzoic acid

The index of Examples 27–29 was 112. Examples 27–29 are substantially completely open-cell foams, made by the in situ process of U.S. Pat. No. 3,748,288. Example 27 is a comparator, containing a flame retardant but not an aldehyde or aldehyde generator. The results obtained with these examples are summarized in Table X.

TABLE X

| Example | 27 | 28 | 29 |
|---|---|---|---|
| Density, lb./cu.ft. | 2.31 | 2.18 | 2.14 |
| Air Permeability | 6.0 | 5.8 | 5.3 |
| Tensile strength, psi | 14.9 | 13.3 | 10.5 |
| Elongation, % | 208 | 191 | 134 |
| Tear Strength, lb./in. | 3.5 | 3.5 | 3.8 |
| UL 94-Unaged | | | |
| Burn Time, sec. | 47.1 | 144.6 | 140.4 |
| Burn Extent, in. | 2.00 | 4.03 | 3.83 |
| Ignites cotton | yes | no | no |
| No. of Drops | 9 | 0 | 0 |
| Char formation | no | yes | yes |

The results in Table X show the effectiveness of this invention in preventing the formation of flaming, dripping embers even in an essentially open-cell foam. Such foams are known to be difficult to protect against combustion because of the open-cell structure which readily allows the passage of air through the body of the foam.

The following examples were prepared by feeding the ingredients to a conventional foaming apparatus to continuously form polyurethane foam buns having a rectangular cross section with thirty-inch sides.

TABLE XI

| Example | 30 | 31 | 32 |
|---|---|---|---|
| Polyester from diethyleneglycol, adipic acid and trimethylolethane, OH no. 56 | 100 | 100 | 100 |
| TDI 67/33 | 50.1 | 50.1 | 50.1 |
| C-4 | 0.25 | 0.25 | 0.25 |
| Black dispersion 73K | 7/45 | 7/45 | 7/45 |
| ESN | 0.5 | 0.5 | 0.5 |
| DM 16D | 0.2 | 0.2 | 0.2 |
| Water | 0.9 | 0.9 | 0.9 |
| M6682 | 1.5 | 1.5 | 1.5 |
| NCM/KAYDOL 4/1 | 1.0 | 1.0 | 1.0 |
| FR-2 | 20.0 | 20.0 | 20.0 |
| CYMEL 481 | 10.85 | — | — |
| Hexamethylenetetramine | — | 2.5 | 2.5 |

The index for Examples 30-32 was 111. In preparing Examples 31 and 32, both according to the invention, the hexamethylenetetramine was dispersed in the FR-2 before adding to the other ingredients. Example 30 is a comparator made according to U.S. Pat. No. 4,139,501. The results from the testing of these examples are summarized in Table XII.

TABLE XII

| Example | 30 | 31 | 32 |
|---|---|---|---|
| Density, pcf. | 2.31 | 2.02 | 2.09 |
| Resilience, % | 22.0 | 25.0 | 25.0 |
| Air Permeability | 0.3 | 0.5 | 0.3 |
| Tensile Strength, psi | 19.9 | 21.7 | 20.4 |
| Elongation, % | 132 | 113 | 111 |
| Tear Strength, lb./in. | 2.5 | 2.2 | 2.3 |
| Cell Count | 26-28 | 28-30 | 28-30 |
| UL 94-Unaged | | | |
| Burn Time, sec. | 35.0 | 40.3 | 44.0 |
| Burn Extent, in. | 0.95 | 1.20 | 1.40 |
| Ignited Cotton | no | no | no |
| Number of Drops | 0 | 0 | 0 |
| Char Formation | yes | yes | yes |
| UL 94-Aged | | | |
| Burn Time, sec. | 45.6 | 46.5 | 55.4 |
| Burn Extent, in. | 1.25 | 1.15 | 1.20 |
| Ignited Cotton | no | no | no |
| Number of Drops | 0 | 0 | 0 |
| Char Formation | yes | yes | yes |

TABLE XIII

| Example | 33 | 34 |
|---|---|---|
| F-76 | 85.0 | 85.0 |
| PL 637 | 15.0 | 15.0 |
| TDI 75/25 | 47.51 | 47.51 |
| DC-200 (50 cs) | 0.6 | 0.6 |
| 3817/58B 3.35/4.05 | 7.4 | 7.4 |
| ESN | 0.1 | 0.1 |
| A-1 | 0.2 | 0.2 |
| Water | 3.5 | 3.5 |
| L-550 | 3.2 | 3.2 |
| FR-2 | 20.0 | 20.0 |
| Hexamethylenetetramine | — | 2.0 |

The index for Examples 33 and 34 was 112. In Example 33, the PL637 and FR-2 were blended together before being added to the other ingredients. In Example 34, the hexamethylenetetramine was dispersed in a blend of the PL637 and FR-2 before being added to the other ingredients. Both of these examples are substantially completely open-cell foams made by the in situ process of U.S. Pat. No. 3,748,288. Example 34 is according to the present invention, while Example 33 is a comparator containing a flame retardant but neither an aldehyde nor an aldehyde generator. The results obtained with these examples are summarized in Table XIV.

TABLE XIV

| Example | 33 | 34 |
|---|---|---|
| Density, pcf | 1.84 | 1.84 |
| Resilience, % | 33.0 | 36.0 |
| Air Permeability | 9.4 | 7.7 |
| Tensile Strength, psi | 10.0 | 19.1 |
| Elongation, % | 231 | 221 |
| Tear Strength, lb./in. | 3.1 | 2.8 |
| Cell-Count | 22-24 | 32-34 |
| UL 94-Unaged | | |
| Burn Time, sec. | 76.9 | 158.2 |
| Burn Extent, in. | 5.0 | 5.0 |
| Ignited Cotton | yes | no |
| Number of Drops | 8 | 0 |
| Char Formation | no | yes |

The product of comparative Example 33 was completely consumed under the conditions of the UL 94 test. Under the same conditions, although the product of Example 34 had a "burn extent" of 5 inches (the same as Example 33) it burned more slowly, and inspection of the specimen at the conclusion of the test showed that it had burned only in the top surface and thus was not totally consumed.

TABLE XV

| Example | 35 | 36 |
|---|---|---|
| F-76 | 85.0 | 85.0 |
| 9148 | 15.0 | 15.0 |
| TDI 75/25 | 54.67 | 54.67 |
| DC-200 (50 cs) | 0.6 | 0.6 |
| C-4 | 0.3 | 0.3 |
| 3817/58B 3.35/4.05 | 7.4 | 7.4 |
| ESN | 0.1 | 0.1 |
| A-1 | 0.2 | 0.2 |
| Water | 3.25 | 3.25 |
| L-550 | 3.2 | 3.2 |
| FR-2 | 20.0 | 20.0 |
| Hexamethylenetetramine | — | 2.0 |

The index for Examples 35 and 36 was 112. In Example 35, the 9148 and FR-2 were blended together before being added to the other ingredients. In Example 36, the hexamethylenetetramine was dispersed in a blend of the 9148 and FR-2 before being added to the other ingredients. Both of these examples are substantially completely open-cell foams made by the in situ process of U.S. Pat. No. 3,748,288. Example 36 is according to the present invention, while Example 35 is a comparator containing a flame retardant but neither an aldehyde nor an aldehyde generator. The results obtained with these examples are summarized in Table XVI.

TABLE XVI

| Example | 35 | 36 |
|---|---|---|
| Density, pcf | 1.93 | 2.07 |
| Resilience, % | 31.0 | 33.0 |
| Air Permeability | 11.0 | 7.1 |
| Tensile Strength, psi | 15.8 | 14.7 |
| Elongation, % | 208 | 172 |
| Tear Strength, lb./in. | 2.9 | 2.1 |
| Cell Count | 24-26 | 40-42 |
| UL 94-Unaged | | |
| Burn Time, sec. | 93.7 | 51.6 |
| Burn Extent, in. | 5.0 | 2.1 |
| Ignited Cotton | no | no |
| Number of Drops | 30 | 19 |
| Char Formation | no | yes |

TABLE XVI-continued

| Example | 35 | 36 |
|---|---|---|
| UL 94-Aged | | |
| Burn Time, sec. | 88.4 | 128.1 |
| Burn Extent, in. | 3.1 | 4.8 |
| Ignited Cotton | yes | no |
| Number of Drops | 21 | 10 |
| Char Formation | no | yes |

Although the product of Example 36, after aging, had a "burn extent" of 4.8 inches it burned more slowly than the product of 35, and inspection of the specimen at the conclusion of the test showed that it had burned only on the top surface, and thus was not almost totally consumed.

The following Examples 37–45 were prepared as hand batches.

TABLE XVII

| Example | 37 | 38 | 39 | 40 | 41 | 42 | 43 | 44 | 45 |
|---|---|---|---|---|---|---|---|---|---|
| Polyester from diethylene glycol, adipic acid, and trimethylolethane; OH no. 56 | 100.0 | 100.0 | 100.0 | 100.0 | 100.0 | 100.0 | 100.0 | 100.0 | 100.0 |
| TDI 65/35 | 50.1 | 50.1 | 50.1 | 50.1 | 50.1 | 50.1 | 50.1 | 50.1 | 50.1 |
| Black 73D | 7.45 | 7.45 | 7.45 | 7.45 | 7.45 | 7.45 | 7.45 | 7.45 | 7.45 |
| A-390 | 2.0 | 2.0 | 2.0 | 2.0 | 2.0 | 2.0 | 2.0 | 2.0 | 2.0 |
| Water | 3.7 | 3.7 | 3.7 | 3.7 | 3.7 | 3.7 | 3.7 | 3.7 | 3.7 |
| NCM | 0.8 | 0.8 | 0.8 | 0.8 | 0.8 | 0.8 | 0.8 | 0.8 | 0.8 |
| KAYDOL | 0.2 | 0.2 | 0.2 | 0.2 | 0.2 | 0.2 | 0.2 | 0.2 | 0.2 |
| NEM | 0.5 | 0.5 | 0.5 | 0.5 | 0.5 | 0.5 | 0.5 | 0.5 | 0.5 |
| DM-16D | 0.3 | 0.3 | 0.3 | 0.3 | 0.3 | 0.3 | 0.3 | 0.3 | 0.3 |
| C-2 | 1.5 | 1.5 | 1.5 | 1.5 | 1.5 | 1.5 | 1.5 | 1.5 | 1.5 |
| FR-2 | 20.0 | 20.0 | 20.0 | — | — | 10.0 | — | — | 20.0 |
| 2 × C - 20 | — | — | — | 20.0 | 10.0 | — | — | — | — |
| CDP | — | — | — | — | — | — | 20.0 | — | — |
| KLORO 4515 | — | — | — | — | — | — | — | 20.0 | — |
| Paraformaldehyde | — | 5.0 | — | — | — | — | — | — | — |
| Hexamethylenetetramine | — | — | 5.0 | 5.0 | 5.0 | 5.0 | 5.0 | 5.0 | — |
| Glyoxal | — | — | — | — | — | — | — | — | 2.5 |

The index for Examples 37–45 was 111. Example 37 is a comparator, and Examples 38–45 are according to the invention. The results obtained on the products of these examples are summarized in Table XVIII.

TABLE XVIII

| Example | 37 | 38 | 39 | 40 | 41 | 42 | 43 | 44 | 45 |
|---|---|---|---|---|---|---|---|---|---|
| ATB | 58.7 | 35.0 | 42.8 | 40.5 | 36.3 | 39.0 | 46.2 | 52.9 | 59.6 |
| AEB | 1.95 | 1.10 | 1.33 | 1.11 | 1.34 | 1.50 | 1.76 | 2.03 | 2.05 |
| Drip Rating | low | none | none | none | none | none | none | none | none |
| Char Formation | no | thick | thick | thick | thick | thick | thick | slight | thick |

ATB = average time of burn, sec.
AEB = average extent of burn, in.

What is claimed is:

1. In a process for the manufacture of flexible, resilient, polyurethane foam by the reaction of at least one polyester polyol, said polyol being the reaction product of at least one polyhydric alcohol with a polycarboxylic acid or anhydride or with a lactone, with at least one organic polyisocyante in the presence of at least one blowing agent and at least one catalyst, the improvement which comprises the step of incorporating into the mixture to be foamed at least one aliphatic aldehyde or aliphatic aldehyde generator, in amount sufficient to reduce the formation of burning embers and to produce a char when said foam is burned.

2. The process of claim 1 wherein the mixture to be foamed also contains at least one flame retardant, in amount sufficient to increase the flame retardant properties of the foam.

3. The process of claim 1 wherein said aliphatic aldehyde contains from 1 to 4 carbon atoms.

4. The process of claim 1 wherein said aliphatic aldehyde is formaldehyde.

5. The process of claim 1 wherein said aldehyde generator is selected from the group consisting of paraformaldehyde, metaldehyde, acetals of low molecular weight aliphatic aldehydes, semi-acetals of low molecular weight aldehydes, and hexamethylenetetramine.

6. The process of claim 1 wherein said aldehyde generator is paraformaldehyde.

7. The process of claim 1 wherein said aldehyde generator is hexamethylenetetramine.

8. The process of claim 7 wherein the hexamethylenetetramine has been treated with benzoic acid in amount sufficient to render it freeflowing.

9. The process of claim 7 wherein the hexamethylenetetramine is blended with clay before incorporation into said mixture to be foamed.

10. The process of claim 2 wherein said flame retardant is selected from the group consisting of esters of phosphoric acid, halogenated esters of phosphoric acid, and halogenated hydrocarbons.

11. The process of claim 2 wherein said flame retardant is tris (1,3-dichloropropyl) phosphate.

12. The product of the process of claim 1.
13. The product of the process of claim 2.
14. The product of the process of claim 3.
15. The product of the process of claim 4.
16. The product of the process of claim 5.
17. The product of the process of claim 6.
18. The product of the process of claim 7.
19. The product of the process of claim 8.
20. The product of the process of claim 9.
21. The product of the process of claim 10.
22. The product of the process of claim 11.

* * * * *